US012093006B2

United States Patent
Kalleppally et al.

(10) Patent No.: US 12,093,006 B2
(45) Date of Patent: Sep. 17, 2024

(54) METHOD AND DEVICE FOR CONTROLLING A DRIVING FUNCTION

(71) Applicant: Robert Bosch GmbH, Stuttgart (DE)

(72) Inventors: Charles Kalleppally, Aalen (DE); Hans-Leo Ross, Lorsch (DE); Jan Wiese, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 293 days.

(21) Appl. No.: 17/697,200

(22) Filed: Mar. 17, 2022

(65) Prior Publication Data

US 2022/0308539 A1 Sep. 29, 2022

(30) Foreign Application Priority Data

Mar. 25, 2021 (DE) ...................... 10 2021 202 935.3

(51) Int. Cl.
*B60R 16/023* (2006.01)
*B60W 50/023* (2012.01)
(Continued)

(52) U.S. Cl.
CPC ......... *G05B 19/042* (2013.01); *B60W 50/023* (2013.01); *B60R 16/023* (2013.01);
(Continued)

(58) Field of Classification Search
CPC ............. B60W 50/04; B60W 50/0098; B60W 50/029; B60W 50/023; B60W 2050/0006;
(Continued)

(56) References Cited

U.S. PATENT DOCUMENTS

| 8,461,783 | B2* | 6/2013 | Navarra | H02P 5/695 |
| | | | | 318/8 |
| 8,603,261 | B2* | 12/2013 | Rosenbauer | F04D 13/06 |
| | | | | 134/57 D |

(Continued)

FOREIGN PATENT DOCUMENTS

| DE | 115398355 A | * | 9/2022 | .......... B60W 50/023 |
| WO | WO-2021183726 A1 | * | 9/2021 | ....... B32B 17/10513 |

OTHER PUBLICATIONS

Karmakar, Raja, Georges Kaddoum, and Ouassima Akhrif. "A novel federated learning-based smart power and 3D trajectory control for fairness optimization in secure UAV-assisted MEC services." IEEE Transactions on Mobile Computing (2023). (Year: 2023).*

(Continued)

*Primary Examiner* — Cuong H Nguyen
(74) *Attorney, Agent, or Firm* — NORTON ROSE FULBRIGHT US LLP; Gerard A. Messina

(57) ABSTRACT

A method for controlling a driving function. In the method, input data relevant for the driving function are conveyed to a cluster, output data are respectively generated by redundant processing of the input data on at least a first processing unit and a second processing unit in the cluster, the respective output data are supplemented by control fields by each processing unit, the output data of the processing units are conveyed to a comparison and a result of the comparison is ascertained, and depending on the result, the output data are utilized on a case-by-case basis together with the respective control fields for the driving function if the output data and control fields bear the comparison, or are marked as erroneous if the output data or control fields deviate.

11 Claims, 6 Drawing Sheets

(51) Int. Cl.
    *B60W 50/04*       (2006.01)
    *G05B 19/042*    (2006.01)
    *G06F 11/16*     (2006.01)

(52) U.S. Cl.
    CPC ......... *B60W 50/04* (2013.01); *B60W 2556/45* (2020.02); *G05B 2219/2637* (2013.01); *G06F 11/16* (2013.01)

(58) Field of Classification Search
    CPC ... B60W 2556/45; B60W 50/06; G06F 11/16; G06F 9/524; G06F 11/302; G06F 11/3409; G06F 1/12; B60R 16/023; G05B 2219/2637; G05B 19/042
    USPC .................................. 714/37, 11, 57; 701/23
    See application file for complete search history.

(56) References Cited

U.S. PATENT DOCUMENTS

| | | | | |
|---|---|---|---|---|
| 9,566,966 | B2* | 2/2017 | Erdem | B60T 8/00 |
| 10,488,856 | B2* | 11/2019 | Vogler | G05D 1/0282 |
| 2018/0370540 | A1* | 12/2018 | Yousuf | B60W 10/04 |
| 2019/0047579 | A1* | 2/2019 | Fahim | B60W 50/0225 |
| 2019/0334706 | A1* | 10/2019 | Fortenberry | H04L 9/0819 |
| 2020/0159421 | A1* | 5/2020 | Karumbunathan | G06F 3/065 |
| 2022/0237414 | A1* | 7/2022 | Zhang | A01M 21/00 |
| 2022/0300344 | A1* | 9/2022 | MacDonald | H04L 12/40039 |
| 2022/0308539 | A1* | 9/2022 | Kalleppally | B60W 50/0098 |
| 2022/0348086 | A1* | 11/2022 | Ross | B60L 58/18 |
| 2023/0095384 | A1* | 3/2023 | Sharma Banjade | G08G 1/096725 701/301 |
| 2023/0113718 | A1* | 4/2023 | Khanna | H04L 67/1044 700/276 |

OTHER PUBLICATIONS

K. Sharma, B. Butler and B. Jennings, "Scaling and Placing Distributed Services on Vehicle Clusters in Urban Environments," in IEEE Transactions on Services Computing, vol. 16, No. 2, pp. 1402-1416, Mar. 1-Apr. 2023, doi: 10.1109/TSC.2022.3173917 (Year: 2023).*

Keshavamurthy, Prajwal, et al. "Edge cloud-enabled radio resource management for co-operative automated driving." IEEE Journal on Selected Areas in Communications 38.7 (2020): 1515-1530. (Year: 2020).*

J. Dong et al., "Mixed Cloud Control Testbed: Validating Vehicle-Road-Cloud Integration via Mixed Digital Twin," in IEEE Transactions on Intelligent Vehicles, vol. 8, No. 4, pp. 2723-2736, Apr. 2023, doi: 10.1109/TIV.2023.3243096. (Year: 2023).*

* cited by examiner

METHOD AND DEVICE FOR CONTROLLING A DRIVING FUNCTION

CROSS REFERENCE

The present application claims the benefit under 35 U.S.C. § 119 of German Patent Application No. DE 10 2021 202 935.3 filed on Mar. 25, 2021, which is expressly incorporated herein by reference in its entirety.

BACKGROUND INFORMATION

The present invention relates to a method for controlling a driving function. The present invention also relates to a corresponding device, a corresponding computer program, and a corresponding memory medium.

BACKGROUND INFORMATION

U.S. Patent Application Publication No. US 2019/047579A1 describes methods and devices, which relate to the provision of a high functional reliability. In one specific embodiment, a master core, which is basically coupled to a slave core "in lockstep," carries out one or multiple operation(s) to support driver assistance systems or autonomous driving. The master core and the slave core receive the same input signal, and the tightly coupled core logic effectuates the generation of a signal in response to the comparison of a first output of the master core and a second output of the slave core. The generated signal causes an interruption of the one or multiple operation(s) in response to a mismatch between the first output and the second output. Other specific embodiments are also described.

In a self-driving autonomous vehicle described in U.S. Patent Application Publication No. US 2018/370540A1, a controller architecture includes multiple processors within the same box. Each processor monitors the others and takes suitable safe measures as necessary. Some processors may run dormant or redundant functions having low priority, which become active when it is detected that another processor has failed. The processors are supplied with current independently of one another and execute redundant algorithms independently of one another, from sensor data processing to actuation commands, using different hardware capabilities. Hardware and software diversity improves the error tolerance.

An autonomous driving controller described in U.S. Patent Application Publication No. US 2019/334706A1 includes multiple parallel processors, which operate on shared input data, which are received by multiple autonomous driving sensors. Each of the multiple parallel processors includes communication circuits, a general processor, a security processor subsystem (SCS), and a safety subsystem (SMS). The communication circuit supports the communication between the parallel processors, including the communication between the general processors of the parallel processors, the communication between the security processor subsystems of the parallel processors by utilizing SCS cryptography and the communication between the safety subsystems of the parallel processors by utilizing SMS cryptography, the SMS cryptography differing from the SCS cryptography. SCS and SMS may each include dedicated hardware and, in particular, memories, to support the communication.

SUMMARY

The present invention provides a method for controlling a driving function, a corresponding device, a corresponding computer program, and a corresponding memory medium.

The approach according to the present invention is based on the insight that the typical security mechanisms for a secure processing unit are also to be implemented in the cloud, in order to be able to functionally securely process data here as well. A typical approach for the incidental hardware errors in the logic unit or for processing the logical sets of commands is the homogeneous parallel redundant processing by homogeneous redundant processing units in a clocked computer. These processing units are compared by an independent unit. In the cloud, the memories are volatile or also non-volatile memories (RAM, ROM, CACHE, etc.) and the entire data control (handlers, multiplex, etc.) is neither transparent nor accessible to the user, and therefore neither these nor the hardware itself may be directly monitored. Therefore, the data are to be sent into the memories and out of the memories in an encrypted manner. This E2E protection is already typical in the cloud for security reasons. In order to utilize this for security, these E2E measures are also to be continuously monitored at run time. As a result, the independence of the data with respect to one another may also be ensured, so that the so-called common cause (i.e., the dependent errors of the two channels to be compared) may be monitored.

In order to achieve a positive comparison, the input data are also to be synchronized and compared. This also applies for the output data, which are synchronized and compared at the same time for the further processing. A clocked redundant control unit of this type is generally referred to as a lockstep controller. In the cloud, the E2E protection as well is then likewise checked in the respective lockstep comparison.

The lockstep is utilized primarily for being able to monitor sporadic and incidental errors in the processing unit (ALU, arithmetic logic unit). Due to the fact that different semantics and coding may be utilized and conveyed to the lockstep and these may be introduced into the E2E monitoring, sporadic systematic errors also become detectable during the run time. Due to the semantics and the coding, a diagnosis is also obtained, which may infer the cause of the error. Therefore, the erroneous information and data packets may be selectively handled and "graceful degradation" may also be carried out.

Conventional lockstep controllers are slower than normal single core computers due to the time synchronization. Moreover, they generally have the disadvantage that, due to the comparison, only one possible deviation of the information from one another may be detected, but not which of the redundant computers is erroneous. In response to a negative comparison of the output data of two processing units, both processing units are therefore usually switched off. Therefore, the unit is less available. Moreover, all results of an operation are usually incorporated into the comparison.

The lockstep comparator may also be designed as a voter in order to achieve a further run time optimization and availability optimization. Here, three sources may then be compared, two correct identical pieces of information then already being sufficient to be able to identify relevant errors. Therefore, the first identical pairs may be forwarded as "secure information" for the processing. Errors in the third channel may therefore be tolerated or also utilized for diagnosis, for system performance, and for optimization.

Against this background, one advantage of the provided approach is that only security-relevant data are compared and conveyed to the comparator, preferably in a continuously (end to end, E2E) protected manner. Therefore, the source of the errors may also be identified. Relevant control fields and security mechanisms are provided, for example, by the AUTOSAR standard.

Advantageous refinements of and improvements on the basic concept of the present invention are possible as a result of the measures disclosed herein. It may be provided that the input data are also provided with control fields and are discarded if inconsistent. An appropriate embodiment takes into consideration the fact that a cloud computer additionally has the risk that external hackers and foreign data streams could reach a processing unit of this type. Therefore, not only are the data streams between the processing unit and the comparator to be sufficiently monitored for independence in each step, but the input data are also to be shielded against external effects.

All data for calculating the basic function (all models for traffic control, diagnostic data, etc.) may be normally calculated in the cloud with the maximum performance. All security-relevant data, encoded in parallel, may be tapped from the process and compared. The basic data may then also be immediately forwarded to the further-processing unit and, only after a successful lockstep comparison, the relevant security attribute is activated by the comparator for the further processing. Therefore, the availability of the information is increased and the disadvantage of the lockstep comparison as compared to a single core with respect to time is compensated for.

BRIEF DESCRIPTION OF THE DRAWINGS

Exemplary embodiments of the present invention are represented in the drawings and are explained in greater detail in the following description.

DETAILED DESCRIPTION OF EXAMPLE EMBODIMENTS

Figure 1:
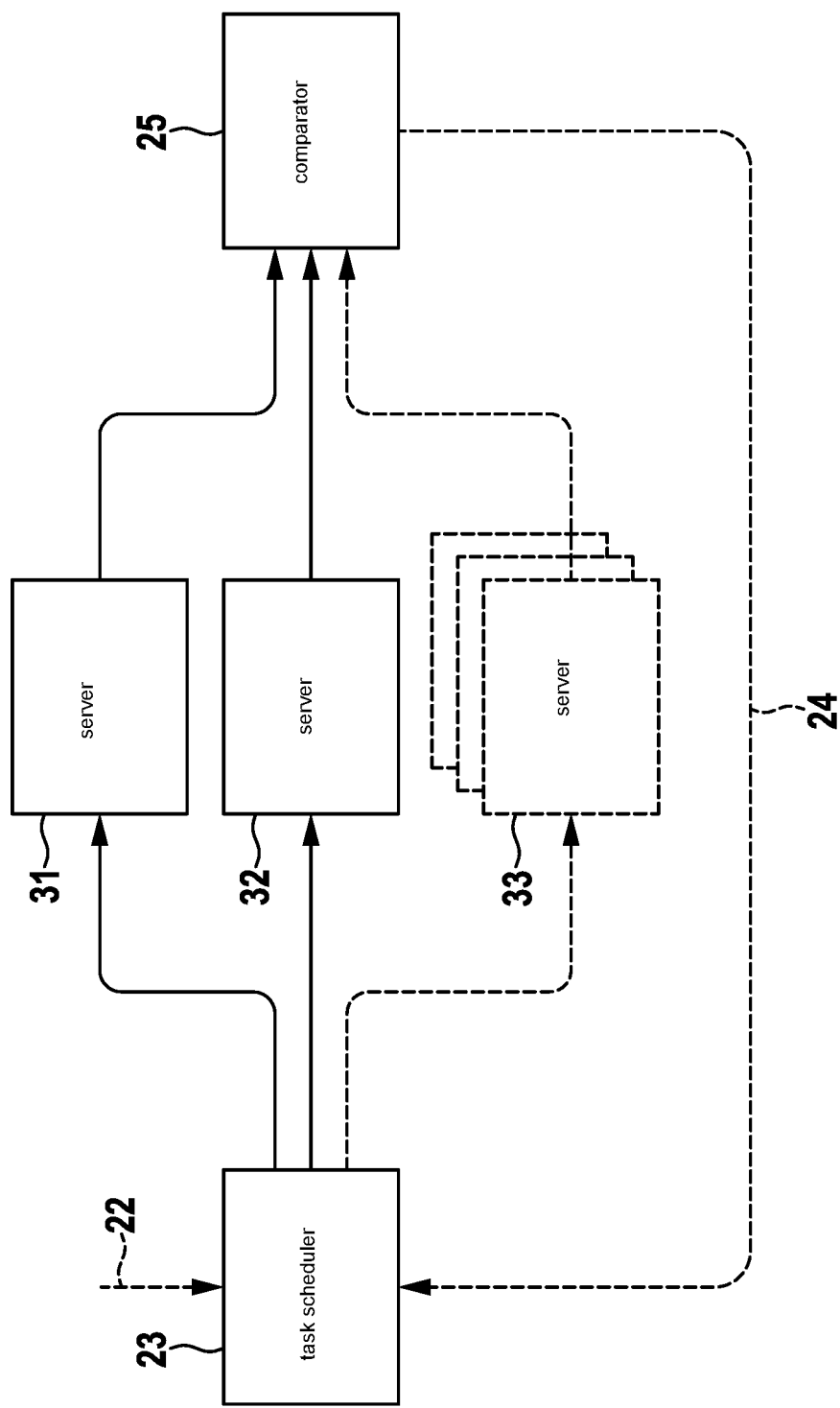
FIG. 1 shows the basic configuration of the lockstep, in accordance with an example embodiment of the present invention.

FIG. 1 illustrates a cluster including functions according to the present invention. The basic functions are carried out with homogeneous redundancy on two different servers 31, 32, the results of which are compared by an independent comparator 25 (also referred to in the following as "comparator"). In order to further increase the availability of the lockstep, the cluster may be supplemented by a third homogeneously redundant server 33 to form an error-tolerant control system having "2oo3 architecture" according to IEC 61508. If two results match in an architecture of this type, the matching information is forwarded.

A task scheduler 23 schedules the processing steps. If the results deviate from one another, these data could only be discarded according to a conventional method; often, both computing cores are switched off in this case by a so-called watchdog. The method according to the present invention, however, pursues the goal of marking the erroneous data as such and, thereby, maintaining the data stream. Moreover, the data to be compared are to be reduced to essential security information.

Figure 2:
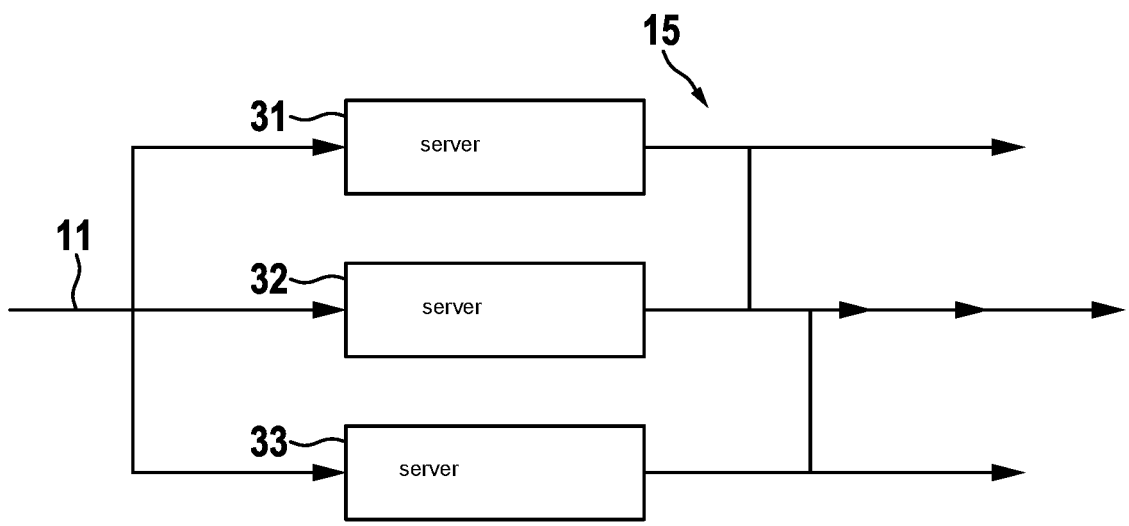
FIG. 2 shows three servers including input data stream and output data stream, in accordance with an example embodiment of the present invention.

As FIG. 2 illustrates, the same input data 11 are conveyed to all three servers 31, 32, 33. In order to achieve the greatest possible independence, all external and server-internal data streams should be continuously protected. In a first processing step, it is to be ensured that input data 11 of all servers 31, 32, 33 are detected at the same point in time, so that the comparison is based on a uniform data status.

This synchronization of input data 11 is followed by the actual logic data processing before output data 15 are prepared for transmission. Conventionally, these three processing steps run in a clock-synchronized manner, which substantially extends the run time of a lockstep system as compared to a single core system.

Due to the E2E protection according to the present invention, the particular challenges of a distributed processing in the cloud are also taken into consideration, in that all relevant effects on the lockstep system result in an inconsistency between the payload and E2E control fields and, for example, may be detected within the scope of a cyclical redundancy check or any other type of security check. Provided output data 15 of servers 31, 32, 33 are identical, these may also be transferred to downstream computation units or vehicles. Even in the case of run time fluctuations or data loss within the scope of the communication, the first incoming packet may already be utilized for a safe driving function.

In principle, a separation of virtual processing units by container-based virtualization may also be achieved in the cloud as on a local server, for example, with the aid of dockers. Each application container is utilized in this case as an independent processing unit. Usually not all data and functions of a processing unit of this type are security-relevant; therefore, the amount of input data 11 to be processed may be reduced due to a limitation to security-relevant data.

Figure 3:
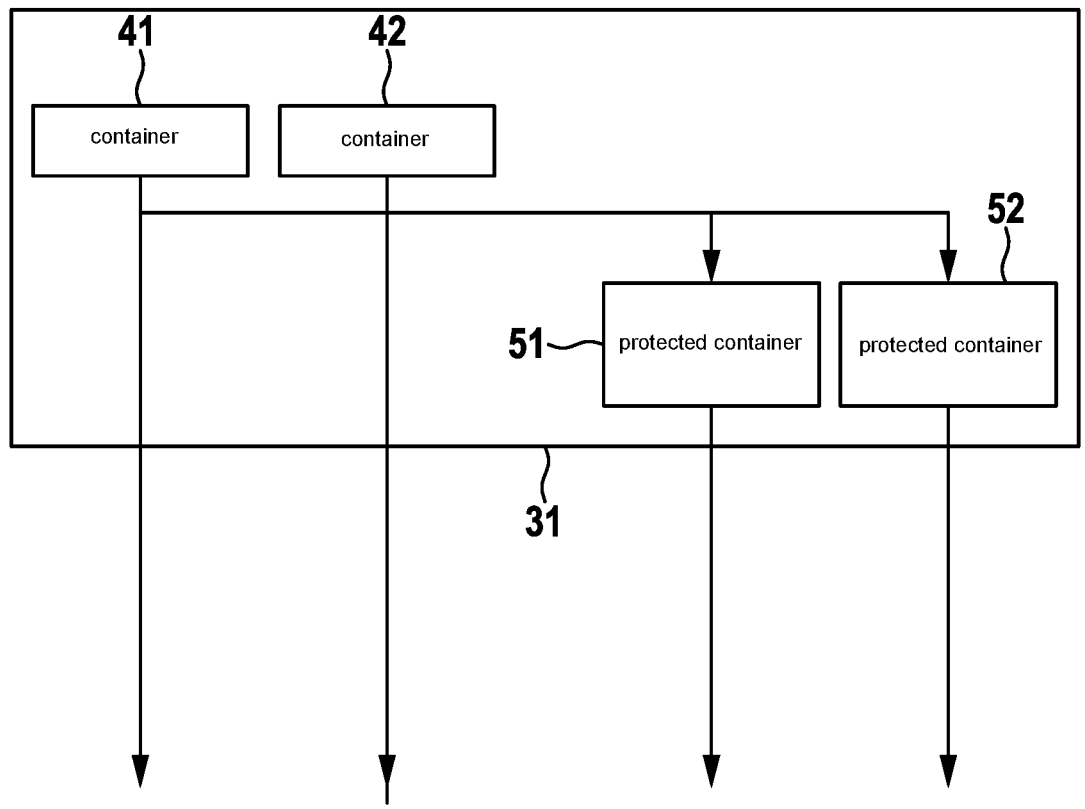
FIG. 3 shows a multi-step lockstep principle for data on different automotive safety integrity levels (ASIL), in accordance with an example embodiment of the present invention.

FIG. 3 shows a server 31 including multiple such application containers 41, 42, 51, 52, output data 15 (FIG. 2) of which are compared in the lockstep. In the example, all data are processed by containers 41, 42, 51, 52 with homogeneous redundancy. All data relevant for the functional safety are conveyed to particularly protected containers 51, 52. The latter are additionally utilized as comparators 25 (FIG. 1) for the two regular application containers 41, 42. Security enclaves may be set up within particularly protected containers 51, 52, in order to also protect the data comparisons against hacker attacks in the best way possible. Non-security-relevant output data 15 (FIG. 2) of regular containers 41, 42, however, may be advantageously immediately forwarded and utilized for driving functions. Optionally, the data may be activated for the further processing for less critical functions—such as steps ASIL B or SIL 2—after the positive comparison in one of safety containers 51, 52.

Figure 4:
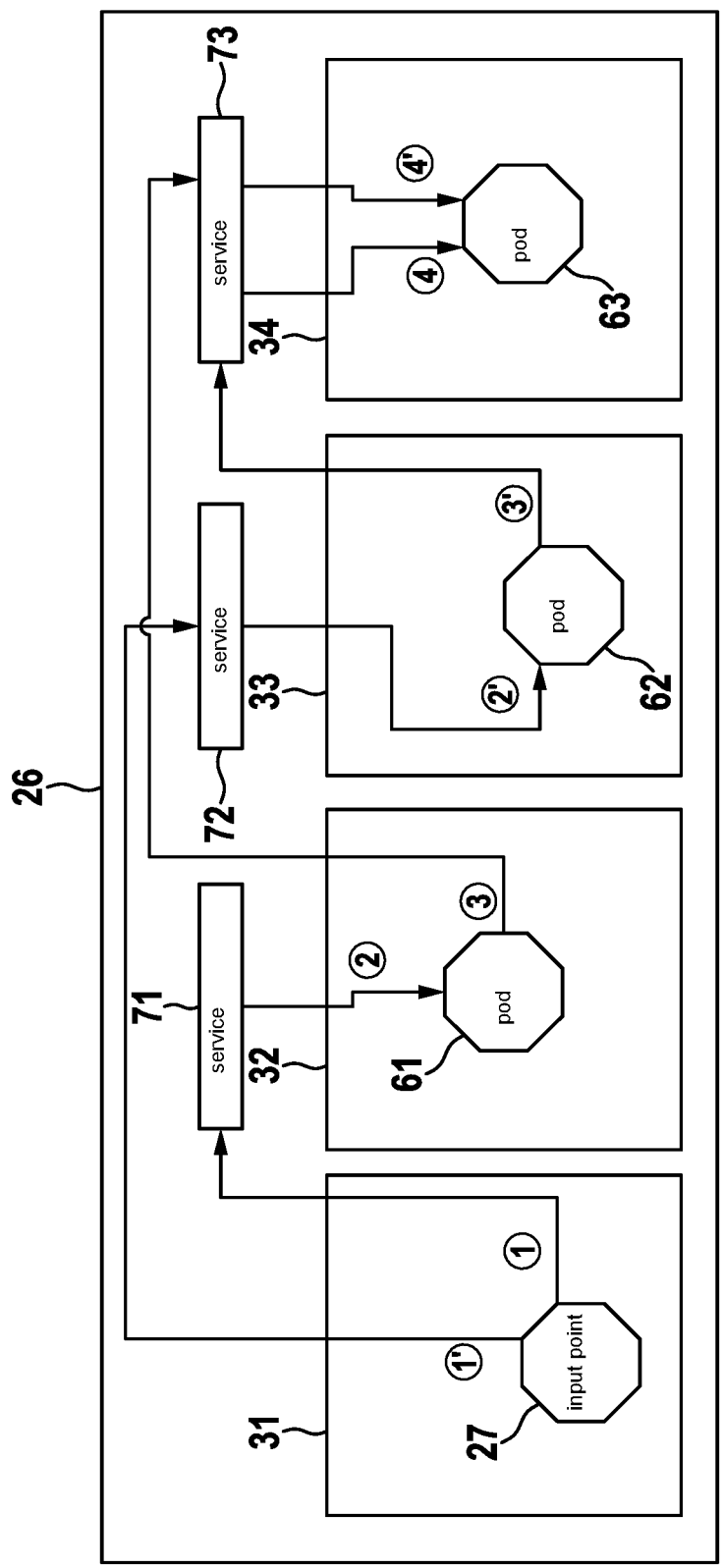
FIG. 4 shows the implementation of the lockstep principle in a Kubernetes cluster, in accordance with an example embodiment of the present invention.

FIG. 4 illustrates an implementation example of a Kubernetes cluster 26 made up of multiple so-called pods 61, 62, 63, each of which may include one or multiple application container(s). The two pods 61, 62, which accommodate containers 41, 42 functioning as processing units, and comparator 43 are each reachable via a separate service of cluster 26; these services 71, 72, 73 are synchronized by one shared input point 27 on a worker node 31 of cluster 26.

Figure 5:
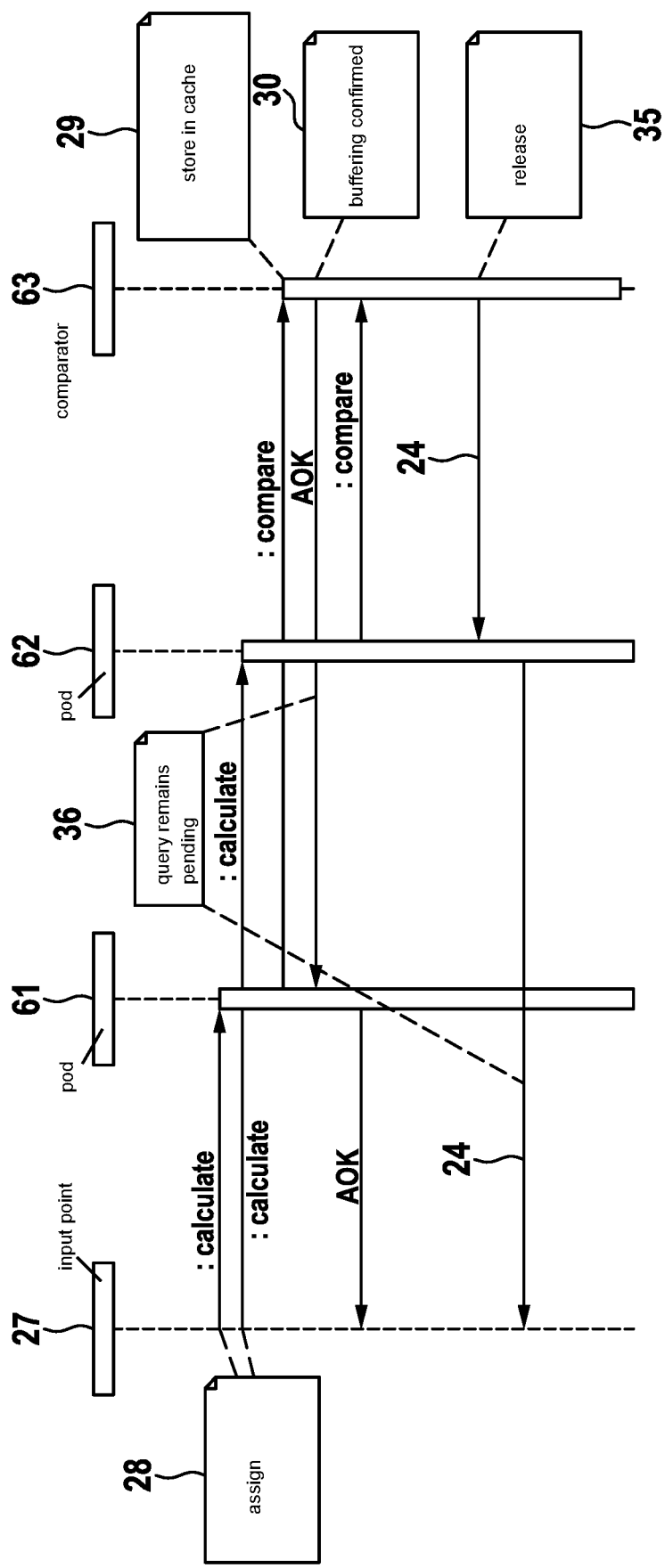
FIG. 5 shows the UML sequence diagram of a logical lockstep function, in accordance with an example embodiment of the present invention.

The behavior of cluster 26 follows the sequence according to FIG. 5. Prior to the processing, input data 11 from input point 27 are provided with a matching identifier, on the basis of which they may be assigned to one another 28 by comparator 63. In the meantime, output data 15 (FIG. 2) presented first to comparator 63 are stored 29 in a cache, which is preferably jointly utilized by multiple instances and may be released 35 again after the comparison. According to the guiding principle of a service-oriented architecture (SOA), the requests remain pending up until the respective result 24 is reported back.

Figure 6:
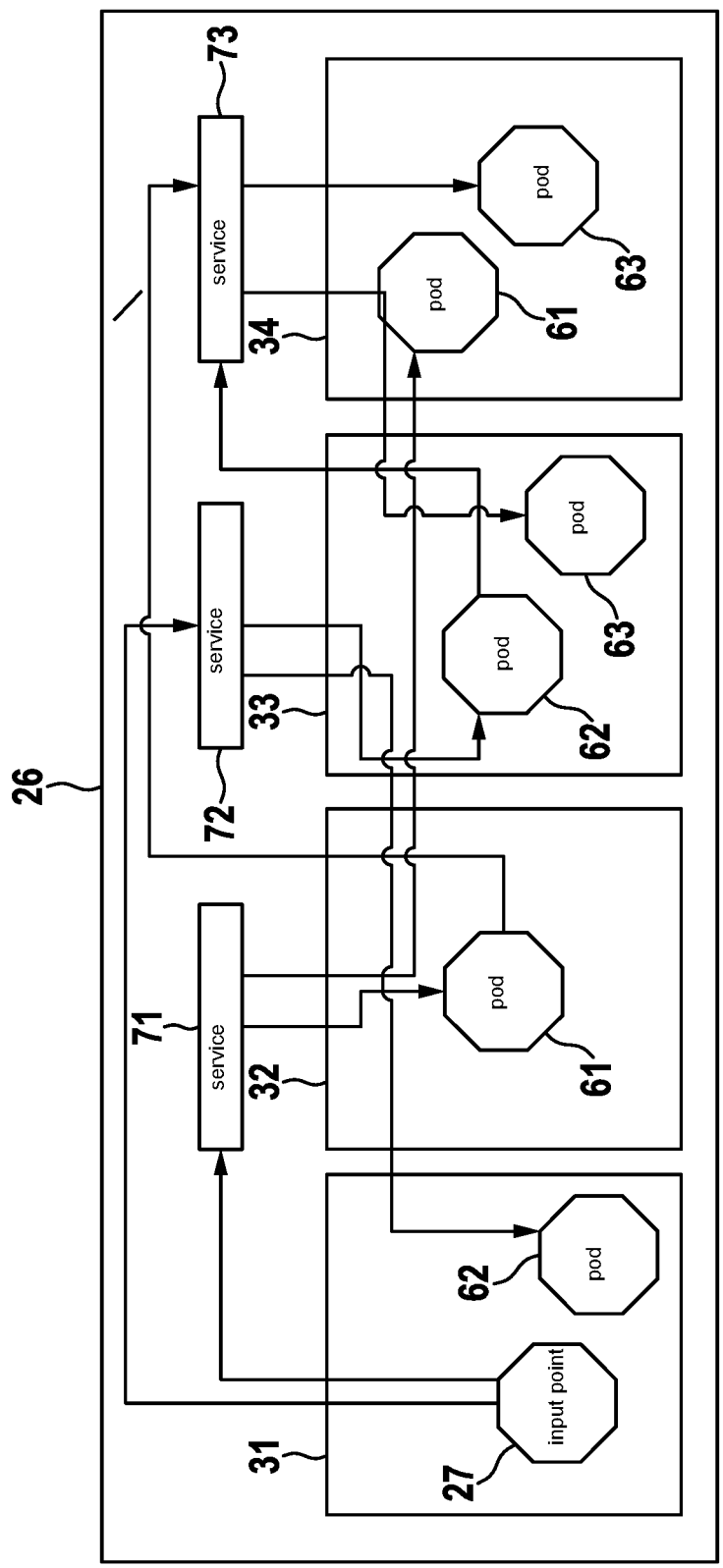
FIG. 6 shows the data exchange including E2E protection between replicas, in accordance with an example embodiment of the present invention.

The logical lockstep function yields the overall image from FIG. 6. Redundant replicas of pods 61, 62, 63 should run on different worker nodes 31, 32, 33, 34, so that the system function of the lockstep remains ensured in the event of failure of an individual node 31, 32, 33, 34. The Kubernetes load balancing may automatically compensate for such failures.

In addition to the porting of the lockstep principle into the cloud environment, the mechanisms of the error control represent an essential aspect of the method provided here. It is meaningful to allow the lockstep to operate in parallel to the intended function, so that the data stream may be activated for the further processing only after the successful checks.

Due to the E2E protection, the sources of possible errors are made perceptible. Errors due to external effects are already indicated by a violation of the E2E protection.

The dependencies of the individual functional elements in the Kubernetes cluster 26 are also indicated by violations of the E2E security. In particular, the paths from one computer outside the cluster to the specific Kubernetes cluster 26 are protected against all effects by the E2E architecture.

All input and output data of the lockstep are also identified by the violation of the E2E comparison. Therefore, in the case of small amounts of security data and real-time data to be processed quickly, these two lockstep steps (input data comparison and output data comparison) may be dispensed with. Due to the prompt comparison in the lockstep, according to the present invention, only errors of one processing unit, which result from errors at its set of commands, are to be taken into consideration. A logical function such as dividing, adding, or taking the logarithm may be quickly compared and the amount of data, which are actually to be compared in a clock-synchronized manner, may be significantly reduced. Alternatively, a coded processing according to IEC 61508 enters into consideration, as part of which only the codings are compared in the lockstep method and the data evaluated as correct are forwarded without delay.

Figure 7:
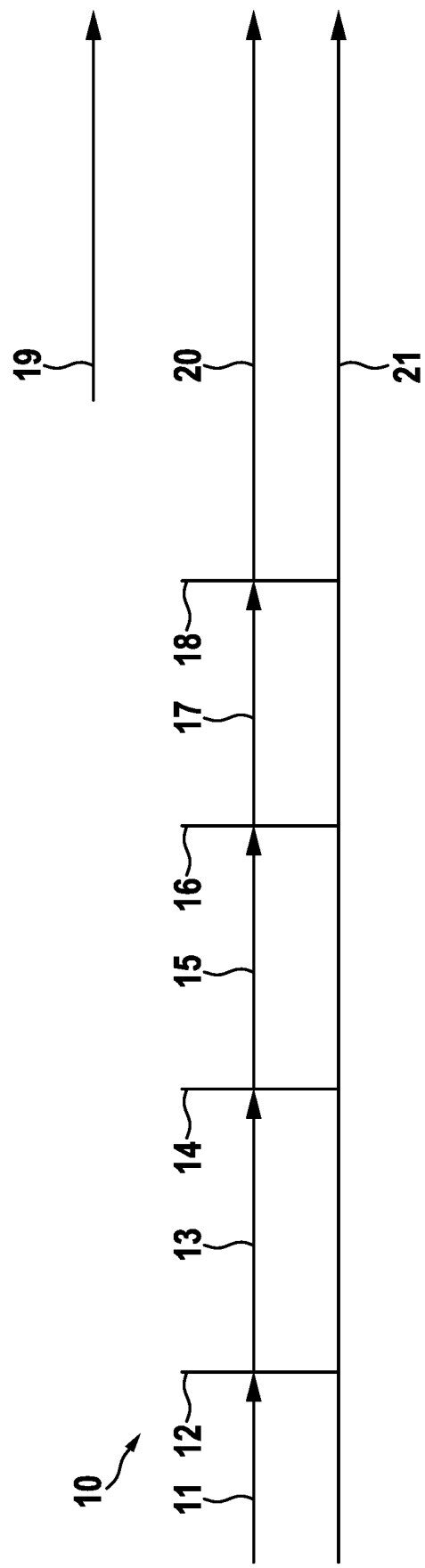
FIG. 7 shows an example of a highly available lockstep application in independent, particularly protected containers, in accordance with an example embodiment of the present invention.

FIG. 7 shows one possible variant of method 10. In particular, at the outputs, comparator 25 (FIG. 1) could also additionally compare the time stamps and, thereby, the point in time at which output data 15 were conveyed 17 thereto. At this point, in the case of a real-time system, a check could also be carried out to determine whether the data are conveyed 17 to comparator 25 (FIG. 1) in a timely manner. If the data and their control fields or signatures prove to be incorrect in the comparison, this delayed finding could nevertheless be forwarded to a further processing unit and provided 20 with a unique signature, which characterizes result 24 (FIG. 1) as delayed, but not incorrect with respect to content. This indication often results in degradations in relevant systems. In soft real-time applications, a result 24 (FIG. 1) of this type could also be tolerated.

Comparators 25 (FIG. 1) may also asynchronously check all features; in this way, for example, comparisons of data, signatures, and time stamps could be checked in a logically differently stepped manner, so that final result 24 (FIG. 1) is sent time-delayed on the highest security level only after all comparisons and checks have been carried out.

Example embodiments of the present invention are also described in the following numbered paragraphs.

Paragraph 1. A method (10) for controlling a driving function, characterized by the following features:
  input data (11) relevant for the driving function are conveyed (13) to a cluster (26),
  output data (15) are respectively generated by redundant processing (14) of the input data (11) on at least a first processing unit (41) and a second processing unit (42) in the cluster (26),
  the respective output data (15) are supplemented (16) by control fields by each processing unit (41, 42),
  the output data (15) of the processing units (41, 42) are conveyed (17) to a comparison and a result (24) of the comparison is ascertained (18), and
  depending on the result (24), the output data (15) are utilized (19) on a case-by-case basis together with the respective control fields for the driving function if the output data (15) and control fields bear the comparison, or are marked (20) as erroneous if the output data (15) or control fields deviate.

Paragraph 2. The method (10) as recited in Paragraph 1, characterized by the following features:
  the input data (11) are also provided with control fields, and
  if the input data (11) and the control fields are inconsistent, the input data (11) are discarded (12) prior to the processing (14).

Paragraph 3. The method (10) as recited in Paragraph 1 or 2, characterized by the following features:
  upon request (22), the input data (11) are distributed by a control program (23) to multiple servers (31, 32, 33) of the cluster (26),
  each processing unit (41, 42) is operated on one of the servers (31, 32, 33), and
  the result (24) or a failure of the comparison are reported back to the control program (23).

Paragraph 4. The method (10) as recited in Paragraph 3, characterized by the following features:
  the processing units (41, 42) are application containers (41, 42, 51, 52),
  the processing (14) of the input data (11), which are security-relevant for the driving function, and the comparison of the output data (15) take place in particularly protected containers (51, 52) from among the application containers (41, 42, 51, 52), and
  the output data (15), which are not security-relevant for the driving function, are immediately forwarded (21).

Paragraph 5. The method (10) as recited in Paragraph 3 or 4, characterized by the following features:
  the cluster (26) is a Kubernetes cluster (26),
  the servers (31, 32, 33) are worker nodes (31, 32, 33, 34) in the cluster (26) including pods (61, 62, 63) replicated in pairs,
  the first processing unit (41) is a first pod (61) from among the pods (61, 62, 63), which is reachable via a first service (71) of the cluster (26), the second processing unit (42) is a second pod (62) from among the pods (61, 62, 63), which is reachable via a second service (72) of the cluster (26), the comparison takes place on a third pod (63) from among the pods (61, 62, 63), which is reachable via a third service (73) of the cluster (26), and the services (71, 72, 73) are synchronized by one shared input point (27) on one of the worker nodes (31, 32, 33, 34).

Paragraph 6. The method (10) as recited in Paragraph 5, characterized by the following features:

prior to the processing (14) on the first pod (61) and second pod (62), the input data (11) from the input point (27) are provided with a matching identifier (28), and the output data (15) presented first to the third pod (63) for the comparison are stored in a cache until the output data (15) to be compared are assigned (29) to one another on the basis of the identifier.

Paragraph 7. The method (10) as recited in Paragraph 6, characterized by the following features:

the buffering of the output data (15) presented first for the comparison is confirmed (30) by the third pod (63), after the comparison, the cache is released (35) by the third pod, and the query (22) remains pending (36) until the result (24) is reported back by the third pod (63).

Paragraph 8. A computer program, which is configured for carrying out the method (10) as recited in one of Paragraphs 1 through 7.

Paragraph 9. A machine-readable memory medium, on which the computer program as recited in Paragraph 8 is stored.

Paragraph 10. A device (31, 32, 33, 34), which is configured for carrying out the method (10) as recited in one of Paragraphs 1 through 7.

What is claimed is:

1. A method for controlling a driving function, comprising the following steps:

in a first processing instance:

conveying first input data relevant for the driving function to a cluster;

generating, by each of a first processing unit and a second processing unit, respective first output data by redundant processing of the first input data on the first processing unit and the second processing unit in the cluster;

supplementing, by each of the first and second processing units, the respective first output data to additionally provide first control fields;

conveying the first output data of the first and second processing units to a comparison, thereby ascertaining a first comparison result; and in response to the first comparison result being that the first output data and first control fields pass the comparison, controlling an operation of a vehicle with the driving function affecting a drive of the vehicle on a road utilizing the first output data together with the first respective control fields; and in a second processing instance:

conveying second input data relevant for the driving function to the cluster;

generating, by each of the first processing unit and the second processing unit, respective second output data by redundant processing of the second input data on the first processing unit and the second processing unit in the cluster;

supplementing, by each of the first and second processing units, the respective second output data to additionally provide second control fields;

conveying the second output data of the first and second processing units to the comparison, thereby ascertaining a second comparison result; and in response to the second comparison result being that the second output data or second control fields deviate, marking the second output data as erroneous so that the second output data is not used for controlling the operation of the vehicle.

2. The method as recited in claim 1, further comprising:

obtaining third input data, wherein the first, second, and third input data are each provided with control fields; and based on the third input data and the control fields provided with the third input data being inconsistent, discarding the third input data prior to a processing of the third input data to convey the third input data to the cluster for generating third output data using the third input data.

3. The method as recited in claim 1, wherein:

in response to a request, the first input data and the second input data are distributed by a control program to multiple servers of the cluster;

each of the first and second processing units is operated on one of the servers; and at least one of (a) the first and second comparison results and (b) or a failure of the second comparison is reported back to the control program.

4. The method as recited in claim 3, wherein:

the first and second processing units are application containers;

processing of the first and second input data, which are security-relevant for the driving function, and the comparison performed for each of the first output data and of the second output data take place in protected containers from among the application containers; and other output data, which are not security-relevant for the driving function, are immediately forwarded for processing without performing the comparison.

5. The method as recited in claim 3, wherein:

the cluster is a Kubernetes cluster;

the servers are worker nodes in the cluster including pods replicated in pairs;

the first processing unit is a first pod from among the pods, which is reachable via a first service of the cluster;

the second processing unit is a second pod from among the pods, which is reachable via a second service of the cluster;

the comparison takes place on a third pod from among the pods, which is reachable via a third service of the cluster; and the services are synchronized by one shared input point on one of the worker nodes.

6. A method for controlling a driving function, the method comprising the following steps:

conveying input data relevant for the driving function to a Kubernetes cluster;

generating, by each of a first processing unit and a second processing unit, respective output data by redundant processing of the input data on the first processing unit and the second processing unit in the cluster;

supplementing, by each of the first and second processing units, the respective output data to additionally provide control fields;

conveying the output data of the first and second processing units to a comparison, thereby ascertaining a comparison result; and performing a selection according to a specification by which (a) an operation of a vehicle is selected to be controlled with the driving function affecting a drive of the vehicle on a road utilizing the output data together with the respective control fields when the comparison result is that the output data and the control fields pass the comparison and (b) the output data is selected to be marked as erroneous so that the operation of the vehicle is performed without use of the output data when the comparison result is that there is a deviation in the output data or the control fields;

wherein:

in response to a request, the input data are distributed by a control program to multiple servers, which are worker nodes in the cluster including pods replicated in pairs;

each of the first and second processing units is operated on one of the servers;

the comparison result a failure of the comparison is reported back to the control program;

the first processing unit is a first pod from among the pods, which is reachable via a first service of the cluster;

the second processing unit is a second pod from among the pods, which is reachable via a second service of the cluster;

the comparison takes place on a third pod from among the pods, which is reachable via a third service of the cluster;

the first, second, and third services are synchronized by one shared input point on one of the worker nodes;

prior to the processing on the first pod and second pod, the input data from the input point are provided with a matching identifier; and a portion of the output data presented first to the third pod for the comparison are buffered by being stored in a cache until the portion stored in the cache and another portion of the output data to be compared to one another are assigned to one another on the basis of the identifier.

7. The method as recited in claim 6, wherein:

the buffering of the portion of the output data presented first for the comparison is confirmed by the third pod;

after the comparison, the cache is released by the third pod; and the request remains pending until the result is reported back by the third pod.

8. A non-transitory machine-readable memory medium on which is stored a computer program for controlling a system that includes a first processing unit and a second processing unit in a cluster for performance of a driving function, the computer program, when executed by a computer, causing the computer to perform the following steps:

in a first processing instance:

conveying first input data relevant for the driving function to the cluster;

generating, by each of the first processing unit and the second processing unit, respective first output data by redundant processing of the first input data on the first processing unit and the second processing unit in the cluster;

supplementing, by each of the first and second processing units, the respective first output data to additionally provide first control fields;

conveying the first output data of the first and second processing units to a comparison, thereby ascertaining a first comparison result; and in response to the first comparison result being that the first output data and first control fields pass the comparison, controlling an operation of a vehicle with the driving function affecting a drive of the vehicle on a road utilizing the first output data together with the first respective control fields; and in a second processing instance:

conveying second input data relevant for the driving function to the cluster;

generating, by each of the first processing unit and the second processing unit, respective second output data by redundant processing of the second input data on the first processing unit and the second processing unit in the cluster;

supplementing, by each of the first and second processing units, the respective second output data to additionally provide second control fields;

conveying the second output data of the first and second processing units to the comparison, thereby ascertaining a second comparison result; and in response to the second comparison result being that the second output data or second control fields deviate, marking the second output data as erroneous so that the second output data is not used for controlling the operation of the vehicle.

9. A device configured to control a driving function, the device configured to:

in a first processing instance:

convey first input data relevant for the driving function to a cluster;

generate, by each of a first processing unit and a second processing unit, respective first output data by redundant processing of the first input data on the first processing unit and the second processing unit in the cluster;

supplement, by each of the first and second processing units, the respective first output data to additionally provide first control fields;

convey the first output data of the first and second processing units to a comparison, thereby ascertaining a first comparison result; and in response to the first comparison result being that the first output data and first control fields pass the comparison, control an operation of a vehicle with the driving function affecting a drive of the vehicle on a road utilizing the first output data together with the first respective control fields; and in a second processing instance:

convey second input data relevant for the driving function to the cluster;

generate, by each of the first processing unit and the second processing unit, respective second output data by redundant processing of the second input data on the first processing unit and the second processing unit in the cluster;

supplement, by each of the first and second processing units, the respective second output data to additionally provide second control fields;

convey the second output data of the first and second processing units to the comparison, thereby ascertaining a second comparison result; and in response to the second comparison result being that the second output data or second control fields deviate, mark the second output data as erroneous so that the second output data is not used for controlling the operation of the vehicle.

10. The method as recited in claim 1, wherein the cluster is implemented in a cloud environment to which the vehicle is communicatively coupled.

11. The method as recited in claim 6, wherein the cluster is implemented in a cloud environment to which the vehicle is communicatively coupled.

* * * * *